United States Patent [19]

Lloyd

[11] Patent Number: 4,699,257

[45] Date of Patent: Oct. 13, 1987

[54] VARIABLE FREQUENCY VIBRATION ISOLATOR

[75] Inventor: Wayne B. Lloyd, Catonsville, Md.

[73] Assignee: Westinghouse Electric Corp., Pittsburgh, Pa.

[21] Appl. No.: 851,916

[22] Filed: Apr. 14, 1986

Related U.S. Application Data

[63] Continuation of Ser. No. 632,973, Jul. 20, 1984, abandoned.

[51] Int. Cl.⁴ .............................................. F16F 7/10
[52] U.S. Cl. ................................. 188/380; 244/17.27;
248/561; 248/576; 267/136; 267/175; 267/287;
280/724
[58] Field of Search ....................... 188/378, 379, 380;
267/36 A, 615, 136, 140.1, 140.2, 175, 177;
248/574, 575, 576, 561, 562, 563; 280/706, 710,
712, 724; 244/17.27

[56] References Cited

U.S. PATENT DOCUMENTS

| | | | |
|---|---|---|---|
| 1,989,235 | 1/1935 | Kimball | 188/67 X |
| 2,569,616 | 10/1951 | Mann | 188/67 X |
| 2,851,126 | 9/1958 | Ward, Jr. | 188/67 X |
| 2,856,200 | 10/1958 | Conflitti | 188/67 X |

Primary Examiner—George E. A. Halvosa
Attorney, Agent, or Firm—L. P. Johns

[57] ABSTRACT

A variable frequency vibration isolator for isolating vibrations between a base and a load having relative displacement of each other characterized by a pair of coil springs in series with a connector between them. The connector is journally mounted for axial movement in response to spring vibrations. Locking means including a timing circuit for clamping and unclamping the connector against movement, so as to improve vibration isolation at frequencies higher than approximately $2f_n$ while substantially improving the performance at lower frequencies.

5 Claims, 5 Drawing Figures

VARIABLE FREQUENCY VIBRATION ISOLATOR

This application is a continuation of application Ser. No. 06/632,973 filed July 20, 1984, now abandoned.

BACKGROUND OF THE INVENTION

1. Field of the Invention

This invention relates to a device for isolating vibrations between a base and a load having relative displacement of each other. Such a device is designated as an isolator and is often used for mounting sensitive instruments on the frame of an aircraft for the elimination of shock and vibration.

2. Description of the Prior Art

Generally, conventional suspension systems or isolators have used a linear viscous damper (or equivalent) to control the amplification of vibration which occurs at the system resonance or natural frequency. Such dampers have resulted in reduced performance of the isolator at all frequencies higher than the resonance because the damper is in a force-producing connection between the vibrating foundation and the load. This invention teaches that the damper is not necessary and that the resonance can be controlled by means to be described in the description of the preferred embodiment. The resulting isolator gives improved isolation both at the resonance and for all frequencies higher than the resonance.

SUMMARY OF THE INVENTION

In accordance with this invention, a variable frequency vibration isolator for isolating vibrations between a base and a load having relative displacement of each other is provided and comprises a pair of coil springs disposed in tandem between a base and a load to resiliently support the load on the base, a reciprocal connector between the springs for forming a unitary spring assembly, locking means adjacent to the connector for clamping and unclamping the connector so as to permit and prevent reciprocation thereof, timing means including a timing circuit for actuating an de-actuating the locking means.

The advantage of the device of this invention is that improved isolation is provided wherein peaking at resonance is controlled by a rapidly varying spring rate rather than by a viscous damper.

DESCRIPTION OF THE PREFERRED EMBODIMENT

Figure 1:
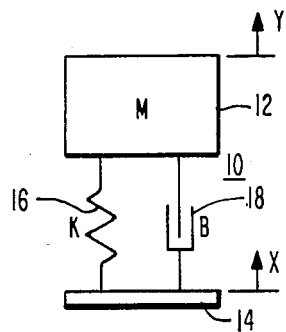
FIG. 1 is a diagrammatic view of a prior art isolator by which a load M is supported by a spring K and a damper B upon a base.

A vibration isolator of prior art construction is generally indicated at 10 (FIG. 1) for supporting a load or mass 12 on a base 14. The isolator includes a coil spring (K) 16 and a surge damper (B) 18. The isolator 10 operates to dissipate any incremental movements Y of the load 12 for incremental movements X of the base 14.

Figure 2:
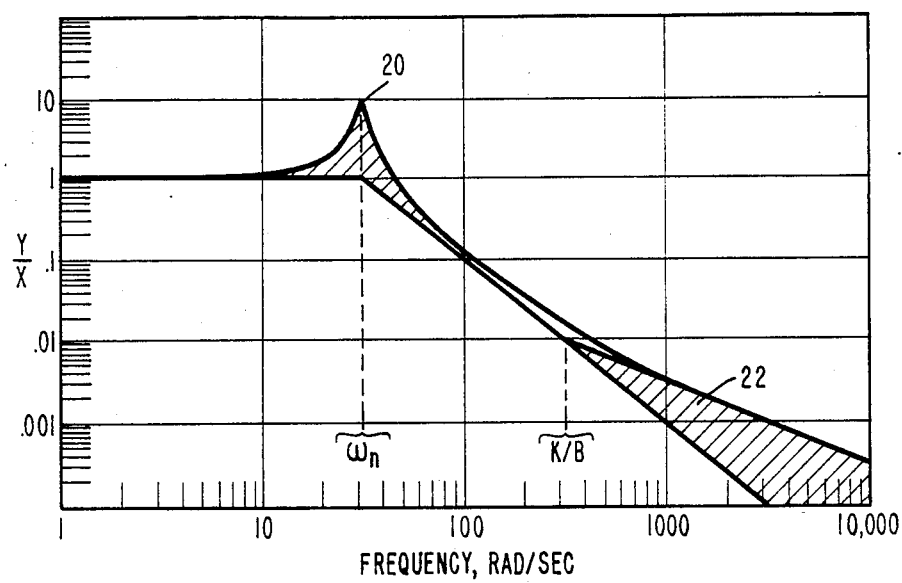
FIG. 2 is a graph showing the factor Y/X plotted against frequency in radians/second.

A plot of the transfer funtion is shown in FIG. 2 in which the function Y/X is plotted against frequency in radians/second. The cross-hatched areas of the transfer function plot illustrate the limitations on performance of the type of isolator 10 of prior art construction. The cross-hatched area in the region 20 near $\omega_n$ illustrates the possibility of very high peaking at the resonant frequency which is an undesirable attribute of many prior isolators. The cross-hatched area 22 beginning at K/B and extending to all frequencies higher than K/B shows the reduction in transmissibility obtained by changing from isolators of prior practice, shown by the upper boundary of 22, to the subject isolator, shown by the lower boundary of 22.

If the disturbance frequency is constant and if it is substantially higher than $\omega_n$, the conventional isolator is at its best. But the majority of applications of the isolator 10 involve wide band random vibrations. This means that energy is being applied to the isolator system at both $\omega_n$ and all other frequencies, to some extent, over the range of approximately 0 to 2000 Hz at all times. Thus, the resonance will be continuously excited, and if it is not well damped, the RMS vibration of the isolated mass will be high. On the other hand, if it is well damped, the increased coupling through the damper 18 will add to the RMS vibration at frequencies higher than K/B.

The dilemma of the prior art condition may be avoided by eliminating or greatly reducing the damping B. Instead of damping, a rapidly varying spring rate, K, is employed to reduce buildup. Since K determines $f_n$ (where $f_n = \omega_n/2\pi$), the natural frequency is rapidly alternating between two or more separate and distinct values. Thus, the concept is to continuously detune the isolator and thereby prevent the buildup of energy at a particular natural frequency.

Normally, the isolator 10 responds as shown in FIG. 2 assuming that the excitation has been applied for some time and that the transients have settled and that the resulting response is as shown in FIG. 2. The variable K isolator, however, takes advantage of the fact that a finite time is required to build up energy in a spring mass system, and that the buildup can be limited to a safe amplitude at resonance by switching to a new set of conditions before the amplitude has the opportunity to build up beyond a small amount. The buildup must then start over again periodically. Thus, the variable K isolator is always operating in the transient phase of the resonance of the spring mass system. For frequencies higher than the resonance, it acts as a conventional isolator locked at either K or 2K, but without a damper to adversely affect the isolator at these higher frequencies. Since the isolator is always operating in the transient phase, it cannot be analyzed by ordinary frequency response methods. This was surmounted by using Runge-Kutta fourth order numerical integration for various base motion inputs and K-switching schemes.

It has been shown by such numerical intergration techniques that a simple 2-state K-switching logic consisting of a dwell at $K_{system} = K$ followed by a dwell at $K_{system} = 2K$ produced excellent results when the switching frequency was set at approximately 60 percent of the resonant frequency for $K_{system} = K$.

The K-switched isolator with the fully locked spring center has a means for limiting the energy input to the isolator system for periodic inputs (or a superposed ensemble of periodic inputs). However, it has no means of dissipating energy once the energy is in the system, except by random out-of-phase initial conditions at the beginning of each new lock state.

There are ways in which energy can enter the system in such a way that the K-switching scheme cannot adequately control it. One is by a base surge motion; for example, a very suddenly applied upward change in the mean value of the foundation position X. Another is a sudden force applied directly to the mass itself other than one originating from foundation motion.

Figure 3:
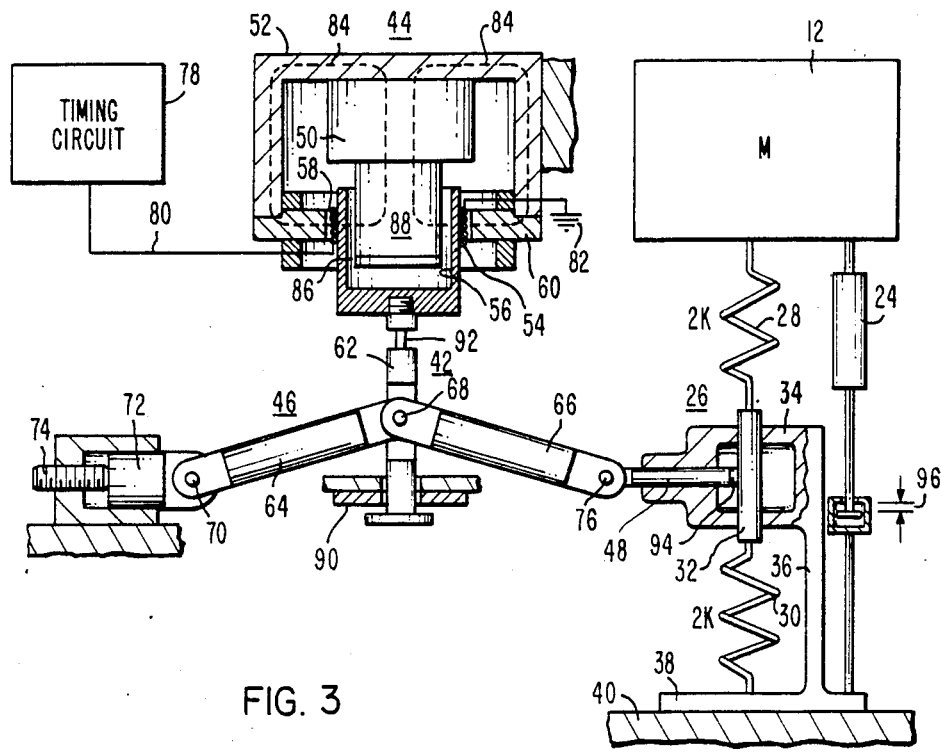
FIG. 3 is a diagrammatic view of the isolator of this invention.

There are at least two ways of dissipating surge energy in those applications that might encounter it. One is a physical damper 24 (FIG. 3). The other is a mode of operation of the locking brake wherein the braking force is insufficient to cause complete locking. This would dissipate energy by acting as a type of coulomb damper. This active coulomb damper scheme will require sensors and control logic which are not shown. In this invention, surge energy is dissipated by a passive viscous damper which has a free travel zone which disconnects it for low amplitude (high frequency) operation.

In accordance with this invention an isolator, generally indicated at 26 (FIG. 3) comprises spring means including at least a pair of coil springs 28, 30 and a spring center anchor or connector 32 having opposite ends connected to the ends of the respective springs. The connector 32 is slidably mounted in a journal or bracket 34 in which it is reciprocable vertically between the springs 28, 30. The bracket 34 is mounted on a pedestal 36 which, in turn, is mounted on or integral with a base 38 then, in turn, is mounted on a frame 40 of a vehicle.

Locking means 42 include an electromagnetic actuator 44 and a toggle linkage structure 46 for clamping and unclamping the connector 32 in position through a plunger 48. The electromagnetic actuator 44 comprises a magnet 50, a permeable core 88, a permeable housing 52 and a coil 54 mounted on a cup-shaped operator 56, which extends through a hole 58 in a permeable cover 60 of the housing 52.

A toggle input link 62 is secured to and extends from the underside of the operator 56 and is connected to a pair of toggle links 64, 66 by a pivot pin 68. Link 64 is pivotally connected at 70 to an adjustable slug 72 having an adjustable screw 74. The toggle link 66 is pivotally connected by a pin 76 to the plunger 48.

A timing circuit 78 is connected by a conductor 80 to the coil 54 at one end and the other end being grounded at 82. The circuit 78 comprises a timer for opening and closing an electric circuit through the coil 54 periodically.

Because of action of the permanent magnet 50, magnetic flux lines 84 extend through the magnet 50, the housing 52, the annular air gap between the hole 58 and the cup 56, the non-permeable cup 56, the air gap 86, and the core 88.

When the timing circuit 78 causes current to pass through the coil 54, the current in the coil 54 interacts with the aforementioned flux in the gap between the cover 60 and the core 88 to produce force on the windings in coil 54 and hence on the operator 56. For clamping action, the timing circuit causes the flow of current, which in turn causes the operator 56 to be driven downwardly, with resulting downward motion of the toggle input link 62. This, in turn, causes motion in the toggle mechanism 46 which causes rightward motion of the plunger 48 into clamping position with the connector 32.

When the timing circuit 78 subsequently opens the coil circuit, the operator 56 returns to an upper position limited by a travel limiter 90, whereby the plunger 48 moves to the left in the non-clamping position of the connector 32. Inasmuch as the toggle link 64 pivots on the pivot pin 70, the pivot pin 68 moves with arcuate motion, which is accommodated by a flexure 92 integral with the toggle input link 62. The flexure also accommodates slight adjustment for wear of a brake pad 94 when made by the adjustment screw 74.

In another embodiment it may be desirable to use the locking plunger 48 as a coulomb damper. In such case, the plunger force is not great enough to produce locking. In FIG. 3 the surge damper 24 is substantially similar to the damper 18 (FIG. 1), except that damper 24 has a range 96 of free travel. For high frequency with high intensity vibration of the frame 40, the damper 24 stays within the free travel range 96 and does not function as a damper.

Figure 4:
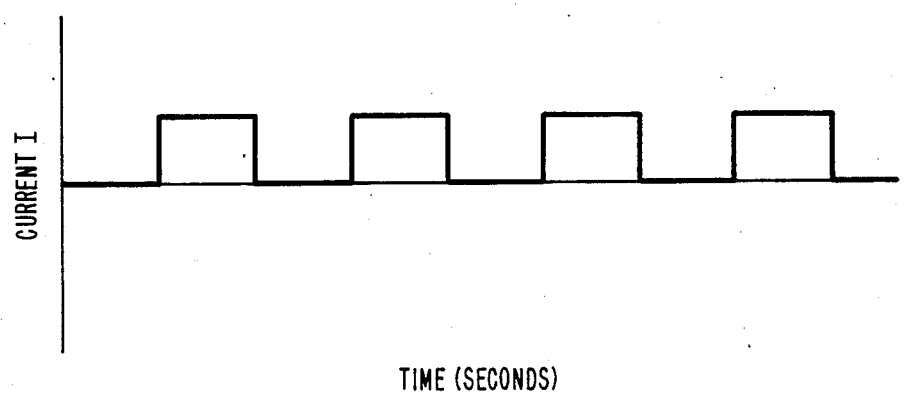
FIG. 4 is a graph showing a simple square wave input of current versus time for controlling the electromagnetically actuated timing means of this invention.

Without the damper, however, the performance of the isolator is markedly improved, especially for frequencies greater than $2f_n$. The rapidly varying spring rate (K), or detuning, technique is the connector 32 electrodynamically actuated and controlled by a simple square wave input, (FIG. 4) from the timing circuit 78.

Figure 5:
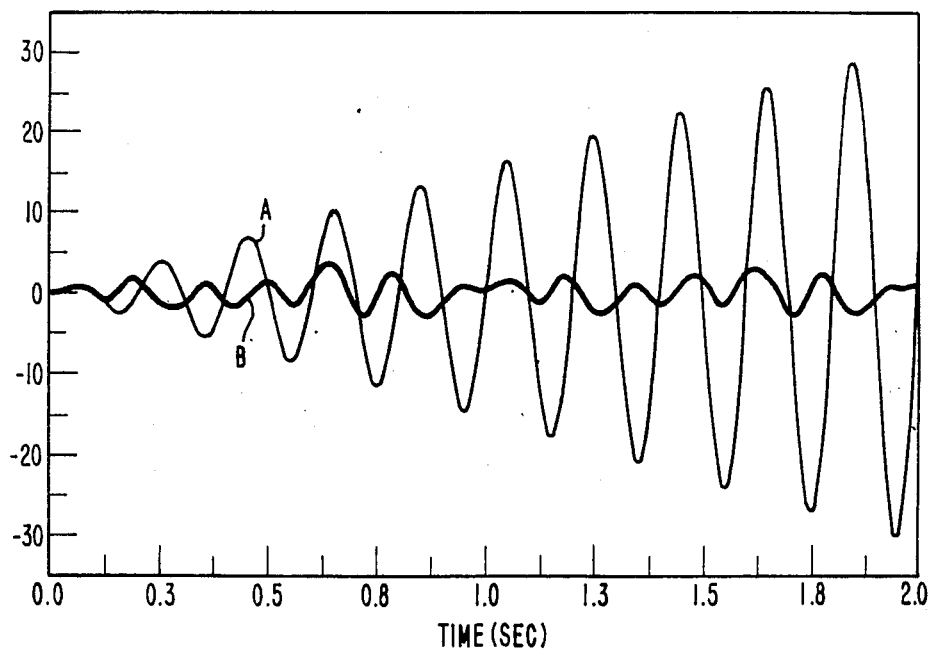
FIG. 5 is a graph showing displacement versus time in response to non-switching and switching conditions.

In FIG. 5, the results of a typical computer run using Runge-Kutta fourth order numerical integration to establish the effectiveness of K-switching with a typical system are shown. For the system plotted in FIG. 5, $\omega_n = 31.5$ radians/second when the spring rate is K and 44.55 radians/second when the spring rate is 2K. The plot is of output displacement Y versus time, T, for an input displacement described by $X = (1.0) \cos(\omega T)$, where $\omega$ is changed to be equal to $\omega_n$ each time the spring rate is switched. FIG. 5 shows two curves. One curve A is a diverging sinusoid curve and the other curve B is a nondiverging smooth curve, which is a series of transients strung together. The diverging curve A is the response of transients strung together. The diverging curve A is the response of the system without switching for the case where the driving frequency is exactly equal to the natural frequency. Since there is no damper to dissipate energy, the amplitude steadily increases without bound. The nondiverging curve B is the response of the system with K-switching at regular (0.15 sec) intervals. Thus, it is clear that this switching logic prevents the buildup of output amplitude even when the system is excited at its most vulnerable frequencies.

Runs were also made for varying K but with the forcing frequency held constant at the $\omega_n$ corresponding to the case where the spring rate is K. This was equivalent to dwelling at resonance when doing a sine sweep. The amplitude was controlled in this case to a level almost identical to that shown in FIG. 5. Runs were also made with the two forcing frequencies applied simultaneously with result similar to FIG. 5. The output response of FIG. 5 is equivalent to a peaking ratio of somewhat less than 2.0, which is better than the performance obtained with most elastomeric isolators, but an elastomeric isolator would, of course, have a low and hence undesirable lead corner at K/B.

A divided spring with a center-dividing member is suitable for being clamped to the vibrating foundation such that the effective spring rate is 2K or some other suitable multiple of K. The spring center member is also suitable for being released so that the effective spring rate from foundation to the load mass is K. An operational logic for locking and unlocking the aforementioned center member for the spring is a square wave of motion of the locking plunger at a frequency approximately equal to 60 percent of the natural frequency of the spring mass system when the spring rate is K. In this logic, the locking member is totally locked with a negligible time of partial locking or sliding.

An actuator with a mechanism having a suitable mechanical advantage to increase the force of the actuator as it is applied to the locking plunger. In the embodiment shown, this mechanism is a toggle linkage although it is conceivable that the linkage can take many other forms. A technique of surge damping involving a conventional viscous damper with a free play zone approximately equal to the normal peaking under the expected random vibration. A microprocessor-controlled amplifier supplies current to the electrodynamic forcer which applies force to the locking plunger.

Generally, the improved vibration isolator of this invention has the basic purpose of markedly improving vibration isolation at frequencies higher than about $2f_n$ while substantially improving the performance at lower frequencies. For example, a variable K isolator having a natural frequency of 5.0 Hz and an equivalent peaking ratio of 2.0 will have a 10:1 improvement in transmissibility at 95.5 Hz compared to a conventional isolator having the same resonance and peaking ratio. The transmissibility improvement steadily increases with frequency, and the same isolator will have the 20:1 improvement in G (RMS) for the white noise input over the frequency range from 9.55 Hz to 2000 Hz.

What is claimed is:

1. A variable frequency vibration isolator for improved isolation both at the resonance and at all frequencies higher than resonance between a base and a load having relative displacement of each other, comprising:

(a) spring means between a base and a load for resiliently supporting the load on the base and including two springs in axially spaced, tandem alignment and a connector located axially between and in series with the springs with one spring between the load and the connector and the other spring between the connector and the base so that the springs and connector form a unified spring assembly;
   (b) the connector having opposite ends connected to opposing, axially aligned ends of the respective springs and being reciprocally mounted in a bracket fixed to said base for guiding movement of the connector;
   (c) friction locking means coupled to the fixed bracket for frictionally clamping and unclamping the connector in place within the fixed bracket so that only the spring adjacent to the load oscillates when the connector is clamped;
   (d) both springs being operable to support the load when the connector is unclamped; and
   (e) timing means including a timing circuit for actuating and deactuating the friction locking means periodically.

2. The isolator of claim 1 in which the springs are coil springs attached to opposite ends of the connector.

3. The isolator of claim 1 in which the friction locking means includes a plunger retractably movable into sliding contact with the connector so as to frictionally clamp and unclamp the connector in place.

4. The isolator of claim 3 in which the locking means includes electromagnetic means connected to the plunger for moving the plunger in response to actuation by the timing circuit.

5. The isolator of claim 4 in which a toggle linkage structure is operatively connected between the electromagnetic means and the plunger for clamping and unclamping the connector in place.

* * * * *